(12) United States Patent
Huang

(10) Patent No.: US 7,849,337 B2
(45) Date of Patent: Dec. 7, 2010

(54) NETWORK SYSTEM PORT THEREOF FOR TRANSMITTING VARIOUS SIGNALS AND POWER

(75) Inventor: Chun-Chi Huang, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 727 days.

(21) Appl. No.: 11/822,900

(22) Filed: Jul. 11, 2007

(65) Prior Publication Data
US 2009/0019296 A1 Jan. 15, 2009

(51) Int. Cl.
*G06F 1/00* (2006.01)
*H04M 1/00* (2006.01)

(52) U.S. Cl. .................. 713/310; 713/300; 379/413

(58) Field of Classification Search ............ 713/310
See application file for complete search history.

(56) References Cited

U.S. PATENT DOCUMENTS

| | | | |
|---|---|---|---|
| 6,912,282 B2 * | 6/2005 | Karam | 379/413 |
| 7,248,097 B2 * | 7/2007 | Montgomery | 327/538 |
| 7,643,320 B2 * | 1/2010 | de la Torre Vega et al. | 363/80 |
| 7,664,136 B2 * | 2/2010 | Toebes et al. | 370/463 |
| 2004/0260794 A1 * | 12/2004 | Ferentz et al. | 709/220 |
| 2006/0168458 A1 * | 7/2006 | Stineman et al. | 713/300 |
| 2008/0244284 A1 * | 10/2008 | Karam et al. | 713/300 |
| 2009/0015237 A1 * | 1/2009 | Vetteth | 324/76.19 |

* cited by examiner

*Primary Examiner*—Suresh K Suryawanshi
(74) *Attorney, Agent, or Firm*—Bacon & Thomas, PLLC

(57) ABSTRACT

The present invention is to provide a network system for transmitting various signals and power, which comprises at least a power sourcing equipment and at least a powered device over a network. Each of the power sourcing equipment and the powered device has at least a port, wherein a first isolated conductor is disposed at one side of the port while a second isolated conductor is disposed at the other side of the port and creates a power circuit for transmitting power in combination with the first isolated conductor. Four differential signal pairs of the port, each with two conductors, are disposed between the first isolated conductor and the second isolated conductor, wherein each of the power sourcing equipment and the powered device transmits Ethernet signals through two of the differential signal pairs of its port and transmits other network signals through the other two differential signal pairs.

10 Claims, 8 Drawing Sheets

NETWORK SYSTEM PORT THEREOF FOR TRANSMITTING VARIOUS SIGNALS AND POWER

FIELD OF THE INVENTION

The present invention relates to a network system, more particularly to a network system having a port for transmitting Ethernet signals, other network signals and power. Thus, in the case that a 8P8C port of a conventional powered device not complied with PoE is plugged into the port, the port of the network system will ensure the conventional powered device to continuously transmit Ethernet signals and prevent it from being damaged.

BACKGROUND OF THE INVENTION

A conventional powered device connected with an Ethernet, such as an IP phone, web camera, wireless bridge, cash register, or secure accessing and monitoring system etc., needs battery or power cord and power socket disposed on the terminal network device for power supply. A better way to do is to supply the power while transmitting data to the powered device connected with the Ethernet. And the Power over Ethernet (PoE) technology provided by the IEEE802.3af standard is capable of transmitting power and data to the powered device connected with the Ethernet at the same time.

Please refer to FIG. 1, PoE is a kind of technology applied to Ethernet that allows the power and data of a power sourcing equipment 1 (such as Ethernet switch, router, hub, other network switch, and mid-span PSE etc., hereinafter abbreviated as PSE) to be transmitted to a powered device 21, 22 or 23 complied with PoE through twisted pair.

Please refer to FIG. 2, if a mid-span PSE, a kind of the power sourcing equipment 1 stated above, is disposed between a conventional remote network device 10 not complied with PoE and a powered device 21, 22 or 23 complied with PoE, the network signals of the conventional remote network device 10 may be received through the mid-span PSE, and meanwhile, the power and data may be transmitted from the mid-span PSE to the powered device 21, 22 or 23, thus the objectives of PoE may be achieved. Therefore, while employing PoE, the powered device 21, 22 or 23 not suitable for extra power cord may be powered and data may be transmitted normally without altering the structure of the Ethernet.

However, the conventional powered device may be damaged if it is provided with high voltage (such as 48V) from the power sourcing equipment 1. Hence, for the safety of the conventional powered device, the power sourcing equipment 1 is equipped with a "discovery procedure" to find out that whether the powered device connected with the power sourcing equipment 1 is complied with PoE, thereby prevents the conventional powered device from being damaged for misconnection with the power sourcing equipment 1.

However, in the case that the power sourcing equipment 1 is provided with 48 "PoE port", the circuit of the power sourcing equipment 1 must comprise twelve sets of Ethernet power supply control unit 3. Please refer to FIG. 3, each set of Ethernet power supply control unit 3 comprises one Ethernet power supply controller 30 and four individual Metal Oxide Semiconductor Field Effect Transistors (MOSFETs) 32, 33, 34 and 35 and controls four ports. For the power sourcing equipment 1 to be equipped with a "discovery procedure", the circuit design of the power sourcing equipment 1 will be quite complicated which leads to higher manufacturing cost. Besides, please refer to FIG. 4, PoE now primarily uses RJ-45 connector 4 as the "PoE port" which is provided with the first to the eighth conductors 41 to 48 from the left to the right wherein the first to the third conductors 41 to 43 and the sixth conductor 46 are utilized to transmit network signals while the fourth, fifth, seventh, and eighth conductors 44, 45, 47 and 48 are utilized to transmit other signals or power. All of the conductors 41 to 48 of the RJ-45 connector 4 may not be able to support other application even when there's a need for transmission of other signals or in the case that PoE is not employed. Thus, developing a new technology for the problems of complicated circuit design, high manufacturing cost and lack of extra conductor has become an issue with great importance.

SUMMARY OF THE INVENTION

For the purpose of solving the problems stated above, after hard work of research and experiments for a long time, the inventor has developed a network system and port thereof for transmitting various signals and power so as to make certain contribution to the public.

One of the objectives of the present invention is to provide a network system for transmitting various signals and power comprising at least a power sourcing equipment and at least a powered device over a network, wherein each of the power sourcing equipment and the powered device is provided with at least a port. A first isolated conductor is disposed at one side of the port while a second isolated conductor is disposed at the other side of the port and creates a power circuit for transmitting power in combination with the first isolated conductor. Four differential signal pairs of the port, each with two conductors, are disposed between the first isolated conductor and the second isolated conductor, wherein each of the power sourcing equipment and the powered device transmits Ethernet signals through two of the differential signal pairs of its port and transmits other network signals through the other two differential signal pairs. The ports of the power sourcing equipment and the powered device are connected with each other through a transmission line, and a conducting wire of the transmission line is disposed between the first isolated conductors, the second isolated conductors, and each set of the corresponding differential signal pairs of the power sourcing equipment and the powered device respectively. Thus, in the case that a 8P8C port of a conventional powered device not complied with PoE is plugged into the port of the power sourcing equipment, the conductors of the 8P8C port are connected to the differential signal pairs instead of the first and second isolated conductors which ensures continuous transmission of Ethernet signals of the conventional powered device and prevents it from being damaged.

Another objective of the present invention is to allow the power sourcing equipment and the powered device to establish connection with each other by using said ports which makes it possible to transmit Ethernet signals and power and reduce the manufacturing cost without building complicated circuit complied with PoE. Meanwhile, the problem of PoE of lacking extra conductor may be solved by transmitting other network signals through using the other two differential signal pairs.

Another objective of the present invention is to provide a port for transmitting various signals and power wherein said port comprises a main body. A first isolated conductor is disposed at one side of the surface of the port while a second isolated conductor is disposed at the other side of the surface of the port and creates a power circuit for transmitting power in combination with the first isolated conductor. Four differential signal pairs of the port, each with two conductors, are disposed between the first isolated conductor and the second isolated conductor wherein two of the differential signal pairs are utilized to transmit Ethernet signals while the other two differential signal pairs are utilized to transmit other network signals. Thus, in the case that a 8P8C port of a conventional powered device not complied with PoE is plugged into said port, the conductors of the 8P8C port are connected to the differential signal pairs instead of the first and second isolated conductors which keeps the conventional powered device from receiving the power transmitted by the first and second isolated conductors and being damaged.

Another objective of the present invention is that while a power sourcing equipment or a powered device is provided with said port, the power sourcing equipment or the powered device is capable of transmitting Ethernet signals and power without complicated circuit complied with PoE, thus the manufacturing cost may be reduced. Meanwhile, the problem of PoE of lacking extra conductor may be solved by transmitting other network signals through using the other two differential signal pairs.

BRIEF DESCRIPTION OF THE DRAWINGS

The foregoing aspects, as well as many of the attendant advantages and features of the present invention will become more apparent by reference to the following detailed description, when taken in conjunction with the accompanying drawings, wherein.

DETAILED DESCRIPTION OF THE PREFERRED EMBODIMENT

Figure 1:
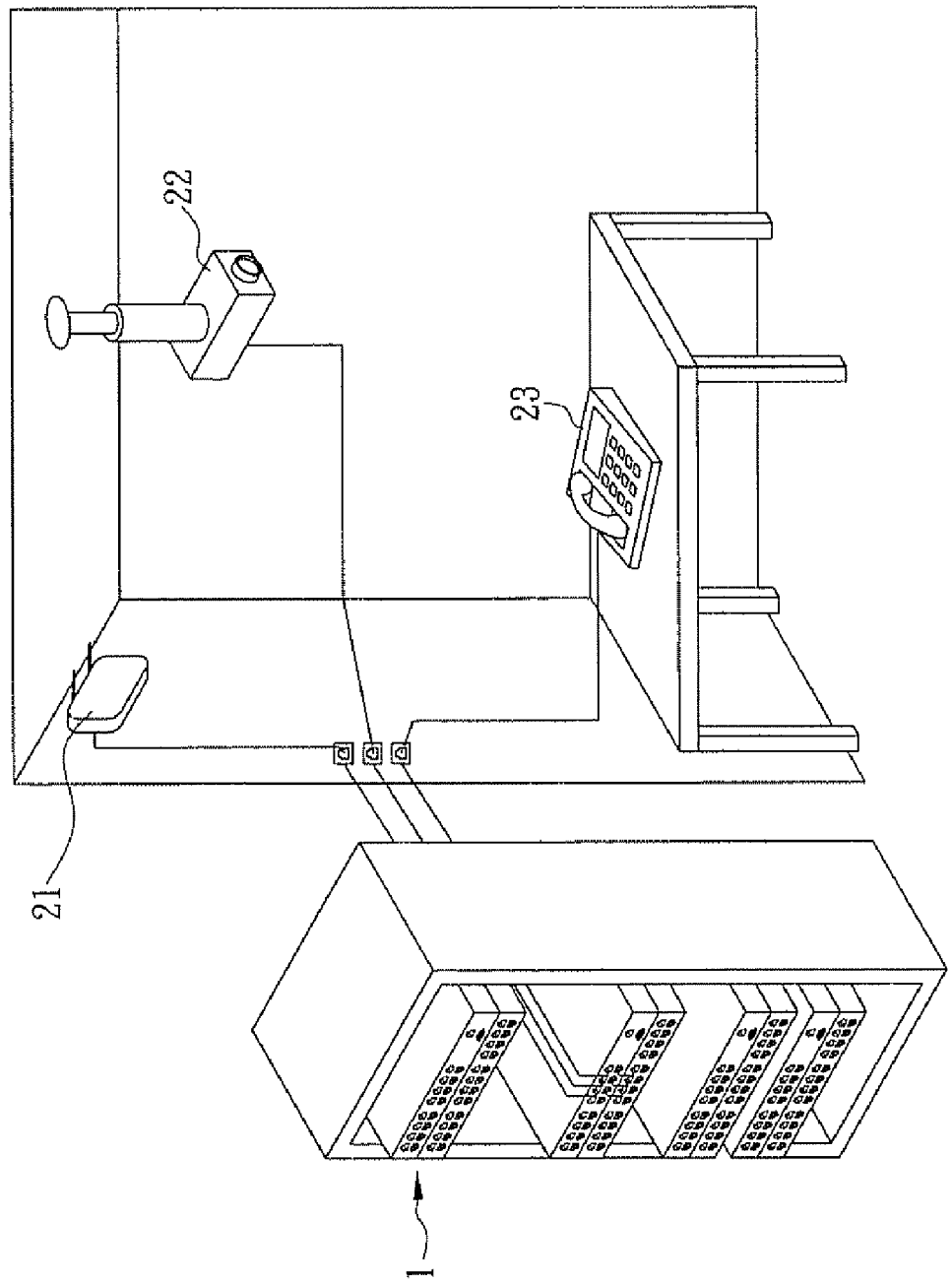
FIG. 1 shows the structure of the conventional power sourcing equipment and powered device.
Figure 2:
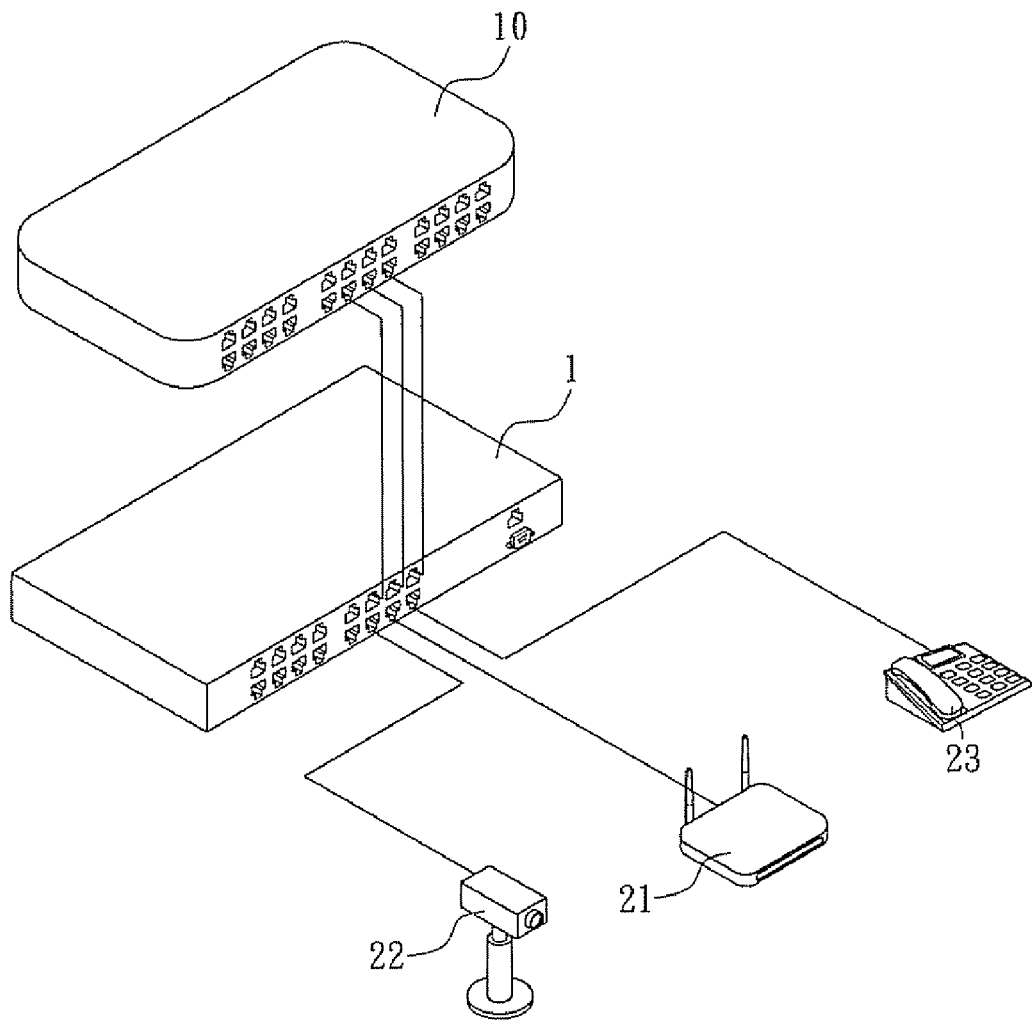
FIG. 2 shows the structure of the conventional remote network device, power sourcing equipment and powered device.
Figure 3:
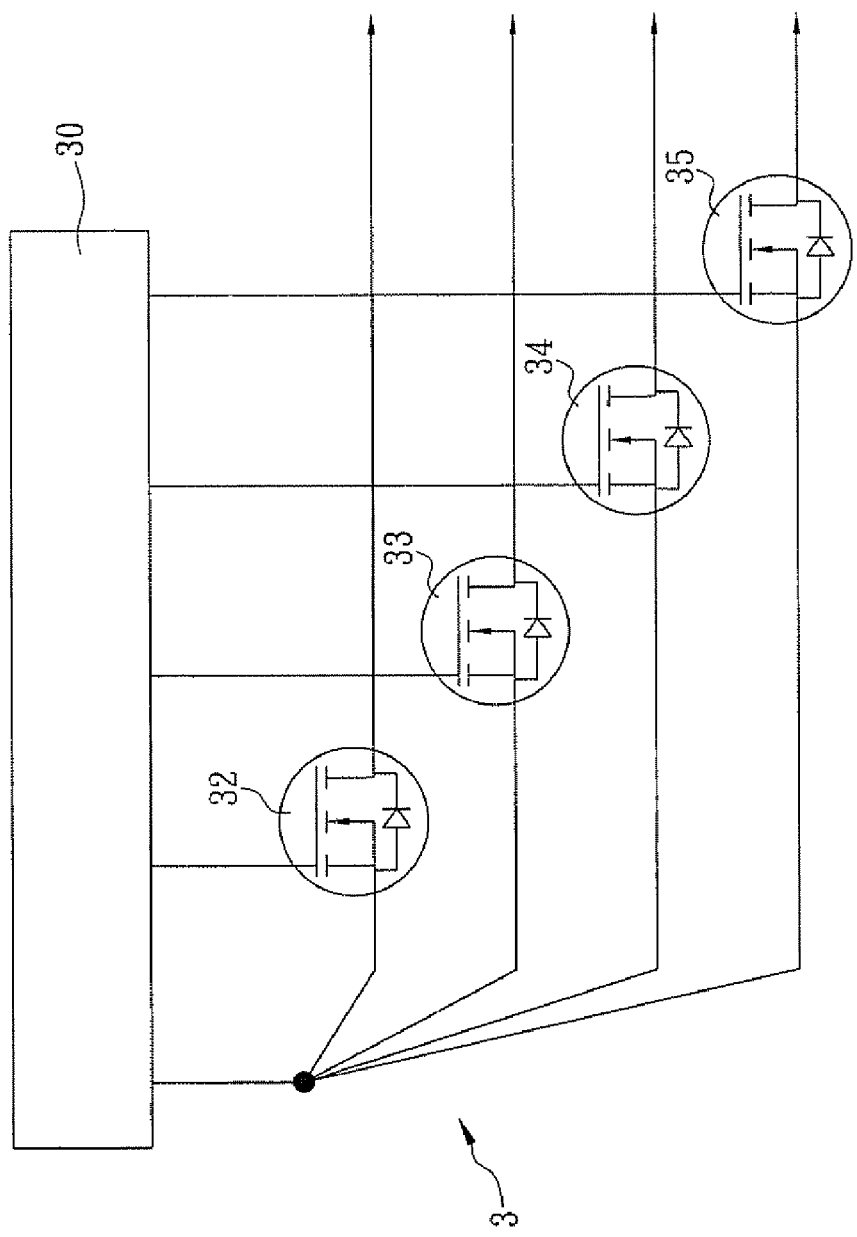
FIG. 3 shows the conventional Ethernet power supply control unit.
Figure 4:
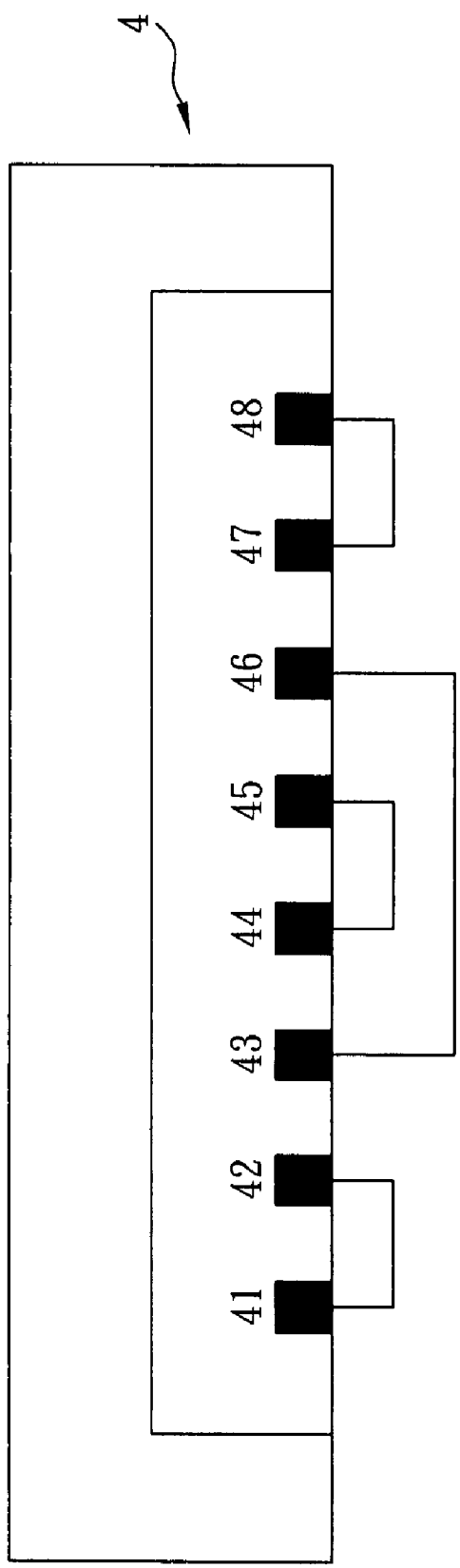
FIG. 4 shows the allocation of the pins of the conventional RJ-45 connector.
Figure 5:
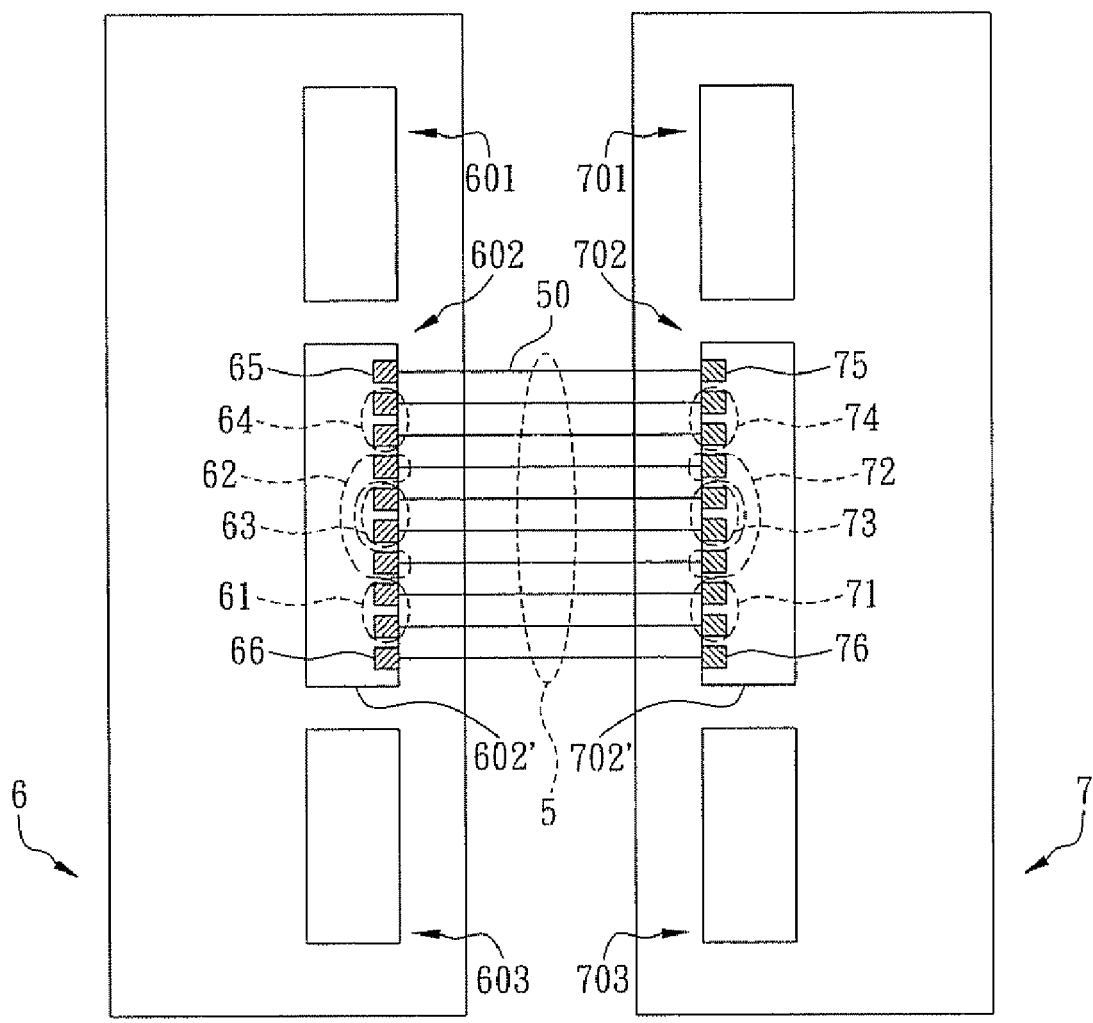
FIG. 5 shows the structure of the power sourcing equipment and powered device of the present invention.
Figure 6:
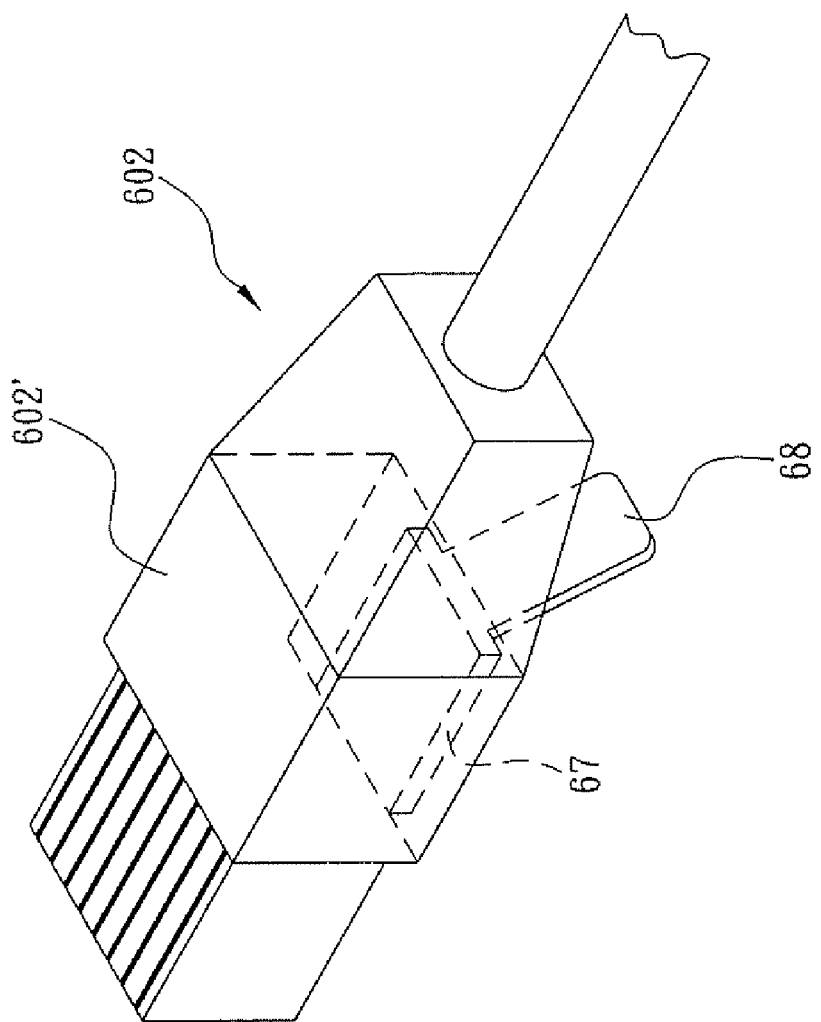
FIG. 6 shows the first and second ports each as a plug of the present invention.
Figure 7:
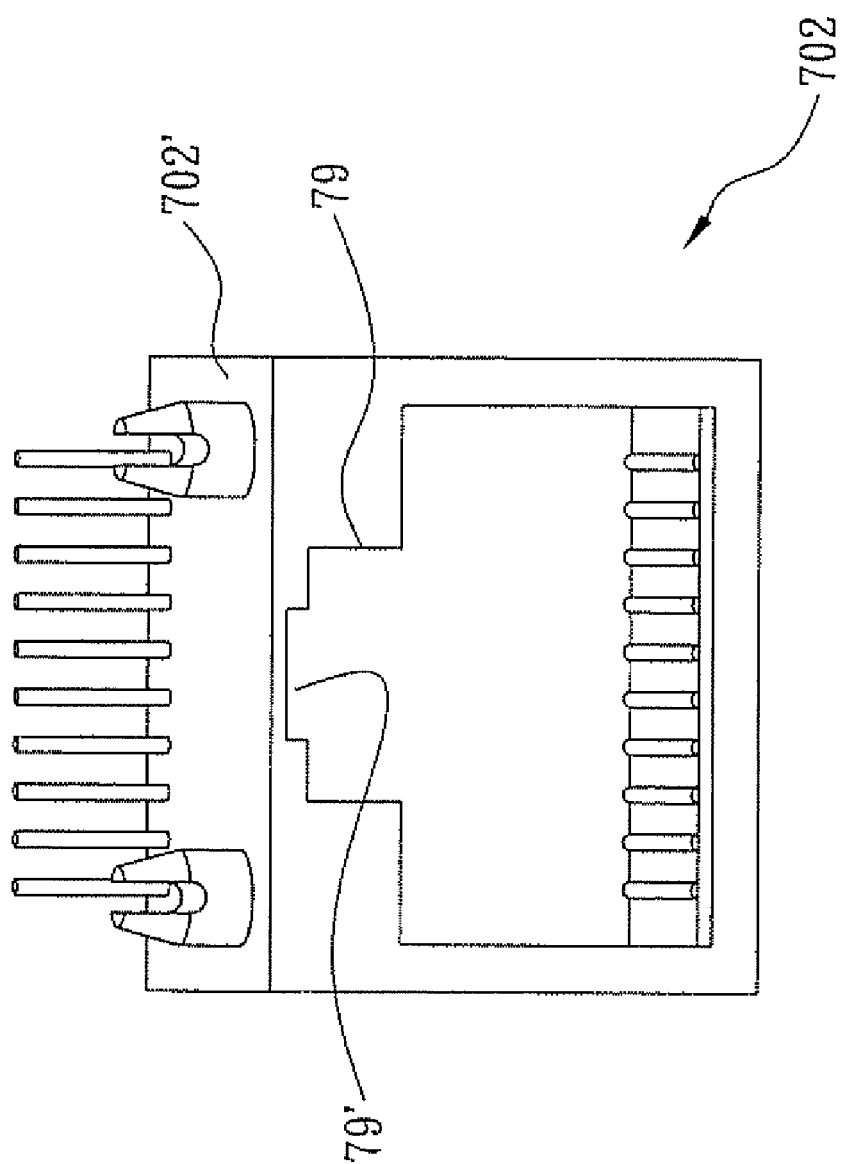
FIG. 7 shows the first and second ports each as a jack of the present invention.

The present invention relates to a network system and port thereof for transmitting various signals and power. Please refer to FIG. 5, said network system for transmitting various signals and power comprises at least a power sourcing equipment (abbreviated as PSE) 6 and at least a powered device (abbreviated as PD) 7 wherein the power sourcing equipment 6 and the powered device 7 are constructed over a network through at least a transmission line 5. Each of the power sourcing equipment 6 and the powered device 7 is provided with at least a port (such as a 10P10C (ten positions, ten conductors) as a plug or a jack as shown in FIGS. 6 and 7) 601, 602 or 603, and 701, 702 or 703, respectively. Each of the ports (602, 702) comprises a main body (602', 702'), wherein a first isolated conductor (65, 75) is disposed near one side of the surface of the main body (602' 702') while a second isolated conductor (66, 76) is disposed near the other side of the surface of the main body (602', 702') and creates a power circuit for power supply in combination with the first isolated conductor (65, 75). A first differential signal pair (61, 71), a second differential signal pair (62, 72), a third differential signal pair (63, 73), and a fourth differential signal pair (64, 74), each composed of two conductors and compatible with the 8P8C (eight positions, eight conductors) port (such as a RJ-45 port) are disposed on the surface of the main body (602' 702') between the first isolated conductor (65, 75) and the second isolated conductor (66, 76). And a conducting wire 50 of the transmission line 5 is disposed between the first isolated conductors (65, 75), the second isolated conductors (66, 76), and each set of the corresponding differential signal pairs (61~64, 71~74) of the power sourcing equipment 5 and the powered device 6 respectively.

Moreover, the first differential signal pair 61 of the power sourcing equipment 6 is utilized to transmit network signals to the first differential signal pair 71 of the powered device 7 while the second differential signal pair 62 of the power sourcing equipment 6 is utilized to receive network signals transmitted from the second differential signal pair 72 of the powered device 7. And the third and fourth differential signal pairs 63, 64, 73, and 74 of the power sourcing equipment 6 and the powered device 7 are utilized to transmit other network signals (such as gigabit Ethernet network signal, detection signal, and control signal etc.).

Please refer to FIG. 5 again, in said embodiment, the third differential signal pair (63, 73) is composed of two central conductors of the main body (602', 702'), the second differential signal pair (62, 72) is composed of two conductors of the main body (602', 702') at both sides of the third differential signal pair (63, 73), the fourth differential signal pair (64, 74) is composed of two conductors of the main body (602', 702') between the first isolated conductor (65, 75) and the second differential signal pair (62, 72), and the first differential signal pair (61, 71) is composed of two conductors of the main body (602' 702') between the second isolated conductor (66, 76) and the second differential signal pair (62, 72). In other words, the locations and the way of pairing of the conductors of the first port 602 and the second port 702 are the same as those of 8P8C port (such as a RJ-45 port) of Ethernet.

Please refer to FIG. 6, in the case that the first port (602) is formed as a plug, wherein a raised part (67) is disposed at the center of one side of the main body (602') opposite to the conductors, and a restraint part (68) with elasticity is extendedly disposed at the end of the raised part (67), so as to enable the first port (602) to be the plug connectable to a jack having 8P8C port. Besides, please refer to FIG. 7, in the case that the second port (702) is formed as a jack, wherein a directing rail (79) matching the raised part (67) of the first port (602) is disposed at the center of one side of the main body (702') opposite to the conductors, and a restraint slot (79') matching the restraint part (68) of the first port (602) is disposed within the directing rail 79, so as to enable the second port (702) to be the jack connectable to the plug with 8P8C port. Hence, the first and the second ports (602, 702) are provided with following advantages:

1. The first port 602 and the second port 702 are capable of directing and coupling with 8P8C ports properly and preventing 8P8C ports from shaking or disconnected regardless of the 8P8C port coupled with the first port 602 or the second port 702 being plug or jack;

2. As stated above, the first port 602 is compatible with the 8P8C port of the type as a plug which enables the power sourcing equipment 6 to transmit its Ethernet signals to a conventional powered device not complied with PoE through the first port 602. In other words, in the case that the 8P8C port of the conventional powered device is misconnected to the first port 602 of the power sourcing equipment 6, the conventional powered device can still operate normally;

3. When the 8P8C port is connected to the first port 602, the first isolated conductor 65 and the second isolated conductor 66 are blocked by part of the surface of the 8P8C port where no conductor is disposed which prevents the first isolated conductor 65 and the second isolated conductor 66 from being misconnected, thus keeps the conventional powered device from being damaged;

4. The first port 602 and the second port 702 are provided with matching structures which enables the power sourcing equipment 6 and the powered device 7 to transmit power by directly using the first isolated conductor (65, 75) and the second isolated conductor (66, 76) without detection circuit complied with PoE, thus the problem of the circuit designed for the "discovery procedure" of the conventional power sourcing equipment being too complicated may be solved and the manufacturing cost may be reduced; and 5. The third and the fourth differential signal pairs (63, 73) and (64, 74) are not occupied when transmitting detection signals and power, so the first port 602 and the second port 702 may transmit other network signals (such as detection signals and control signals) by using the third and the fourth differential signal pairs (63, 73) and (64, 74).

Figure 8:
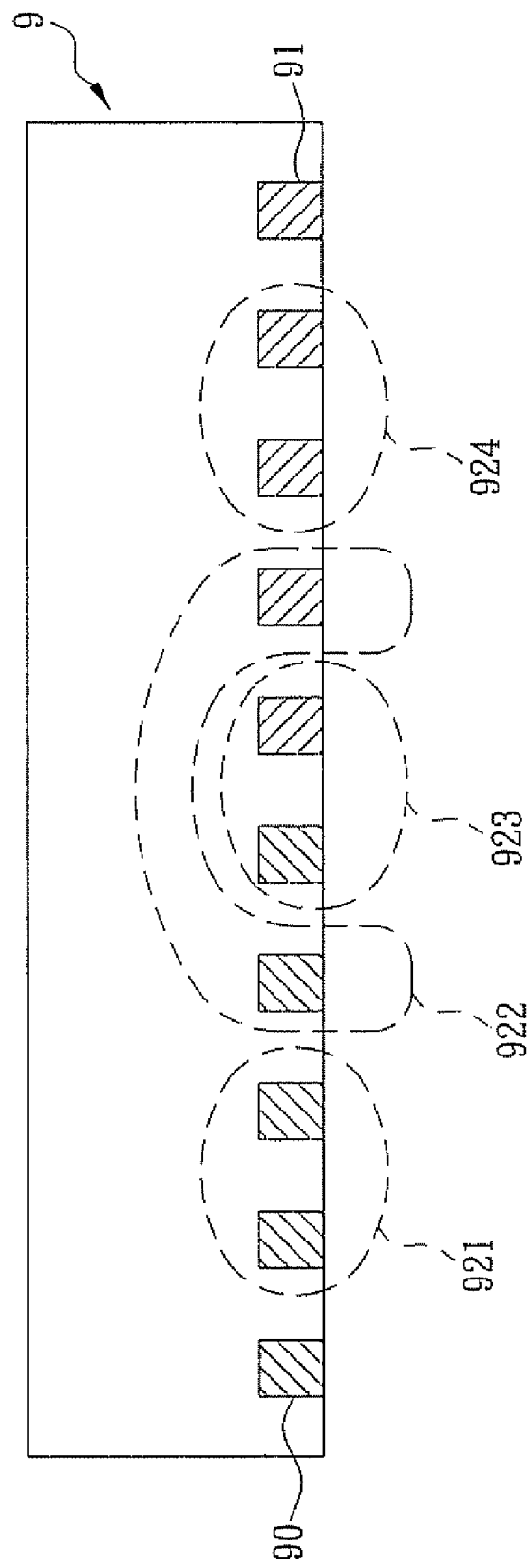
FIG. 8 shows the pins allocation of the port of the present invention.

Please refer to FIG. 8, the present invention of a port for transmitting various signals and power is provided with a main body 9. A first isolated conductor 90 is disposed at one side of the surface of the main body 9 while a second isolated conductor 91 is disposed at the other side of the surface of the main body 9 and creates a power circuit in combination with the first isolated conductor 90. Four differential signal pairs 921, 922, 923 and 924, each composed of two conductors and compatible with the 8P8C port, are disposed between the first isolated conductor 90 and the second isolated conductor 91, wherein two of the differential signal pairs 921 and 922 are utilized to transmit network signals and the other two differential signal pairs 923 and 924 are utilized to transmit other network signals (such as gigabit Ethernet network signal, detection signal, and control signal etc.). Thus, in the case that a power sourcing equipment 6 or a powered device 7 over a network is provided with a port 9, the power sourcing equipment 6 and the powered device 7 may be connected with each other by using the port 9 and capable of transmitting network signals, power, and other network signals. Besides, while a 8P8C port of a conventional powered device not complied with PoE is connected to the power sourcing equipment 6, the 8P8C port will be connected with the differential signal pairs 921, 922, 923 and 924 only instead of the first isolated conductor 90 and the second isolated conductor 91 which keeps the conventional powered device from receiving any power and ensures continuous transmission of network signals.

As stated above, that the Ethernet signals and power may be transmitted between the power sourcing equipment 6 and the powered device 7 simultaneously means that the power sourcing equipment 6 and the powered device 7 are complied with PoE. Besides, in the case that the power sourcing equipment 6 is connected with a conventional powered device, the conventional powered device may keep on transmitting network signals without being damaged, thus the problem stated above that the conventional powered device will be damaged when misconnected to power sourcing equipment may be perfectly solved.

While the invention herein disclosed has been described by means of specific embodiments, numerous modifications and variations could be made thereto by those skilled in the art without departing from the scope and spirit of the invention set forth in the claims.

What is claimed is:

1. A network system for transmitting various signals and power, wherein said system is constructed over a network, comprising:

at least a power sourcing equipment;

at least a powered device, each of said power sourcing equipment and said powered device is provided with at least a port having a main body, a first isolated conductor is disposed near one side of the surface of said main body while a second isolated conductor is disposed near the other side of the surface of said main body and creates a power circuit for power supply in combination with said first isolated conductor, and a first differential signal pair, a second differential signal pair, a third differential signal pair, and a fourth differential signal pair, each composed of two conductors disposed on the surface of said main body, are disposed on the surface of said main body between said first isolated conductor and said second isolated conductor, and said ports of said power sourcing equipment and said powered device are connected with each other through a transmission line, and a conducting wire of said transmission line is disposed between said first isolated conductors, said second isolated conductors, and each set of the corresponding differential signal pairs of said power sourcing equipment and said powered device respectively.

2. A network system for transmitting various signals and power of claim 1, wherein the first to the fourth differential signal pairs are compatible with four differential signal pairs of a 8P8C port.

3. A network system for transmitting various signals and power of claim 2, wherein said first differential signal pair of said power sourcing equipment is utilized to transmit network signals to said first differential signal pair of said powered device.

4. A network system for transmitting various signals and power of claim 3, wherein said second differential signal pair of said power sourcing equipment is utilized to receive network signals transmitted from said second differential signal pair of said powered device.

5. A network system for transmitting various signals and power of claim 4, wherein said third and fourth differential signal pairs are utilized to transmit other network signals of said power sourcing equipment and said powered device.

6. A network system for transmitting various signals and power of claim 5, wherein said other network signals are gigabit Ethernet network signals.

7. A network system for transmitting various signals and power of claim 5, wherein said third differential signal pair is composed of two conductors at the central of the surface of said main body, said second differential signal pair is composed of two conductors of said main body at both sides of said third differential signal pair, said fourth differential signal pair is composed of two conductors of said main body between said first isolated conductor and said second differential signal pair, and said first differential signal pair is composed of two conductors of said main body between said second isolated conductor and said second differential signal pair.

8. A port for transmitting various signals and power, comprising:
- a main body;
- a first isolated conductor disposed near one side of the surface of said main body;
- a second isolated conductor disposed near the other side of the surface of said main body, wherein said second isolated conductor and said first isolated conductor create a power circuit; and
- four differential signal pairs disposed at said main body between said first isolated conductor and said second isolated conductor, wherein each of said differential signal pairs is composed of two conductors.

9. A port for transmitting various signals and power of claim 8, wherein two of said differential signal pairs are utilized to transmit network signals and the other two of said differential signal pairs are utilized to transmit other network signals.

10. A port for transmitting various signals and power of claim 9, wherein said other network signals are gigabit Ethernet network signals.

* * * * *